United States Patent
Girondi (10) Patent No.: US 9,314,724 B2
(45) Date of Patent: Apr. 19, 2016

(54) FILTER GROUP

(75) Inventor: Giorgio Girondi, Mantova (IT)

(73) Assignee: UFI INNOVATION CENTER S.R.L., Ala (Trento) (IT)

( * ) Notice: Subject to any disclaimer, the term of this patent is extended or adjusted under 35 U.S.C. 154(b) by 214 days.

(21) Appl. No.: 14/113,116

(22) PCT Filed: Apr. 18, 2012

(86) PCT No.: PCT/IB2012/000799
§ 371 (c)(1),
(2), (4) Date: Oct. 21, 2013

(87) PCT Pub. No.: WO2012/143793
PCT Pub. Date: Oct. 26, 2012

(65) Prior Publication Data
US 2014/0041346 A1    Feb. 13, 2014

(30) Foreign Application Priority Data
Apr. 20, 2011  (IT) .............................. RE2011A0028

(51) Int. Cl.
  *B01D 46/00*  (2006.01)
  *B01D 29/15*  (2006.01)
  *B01D 46/24*  (2006.01)

(52) U.S. Cl.
  CPC .............. *B01D 46/001* (2013.01); *B01D 29/15* (2013.01); *B01D 46/2414* (2013.01); *B01D 2201/291* (2013.01); *B01D 2201/305* (2013.01); *B01D 2201/4007* (2013.01); *B01D 2201/4084* (2013.01); *B01D 2265/028* (2013.01)

(58) Field of Classification Search
  CPC .. B01D 29/15; B01D 46/001; B01D 46/2414; B01D 2201/291; B01D 2201/305; B01D 2201/4007; B01D 2201/4084; B01D 2265/028
  See application file for complete search history.

(56) References Cited

U.S. PATENT DOCUMENTS

| 5,458,767 A * | 10/1995 | Stone ............................ 210/90 |
| 5,538,626 A * | 7/1996 | Baumann ...................... 210/130 |
| 5,688,396 A * | 11/1997 | Baumann et al. ............. 210/130 |
| 5,770,065 A * | 6/1998 | Popoff .................... B01D 27/07 210/232 |
| 6,053,334 A * | 4/2000 | Popoff et al. ................. 210/438 |
| 6,113,781 A * | 9/2000 | Popoff et al. ................. 210/234 |
| 6,251,273 B1 * | 6/2001 | Jawurek et al. ............... 210/232 |
| 6,635,175 B2 * | 10/2003 | Stankowski ........... B01D 35/30 210/232 |
| 7,882,961 B2 * | 2/2011 | Menez .................... B01D 29/21 210/435 |
| 8,070,945 B2 * | 12/2011 | Stankowski ........... B01D 29/21 210/232 |
| 2003/0024870 A1 * | 2/2003 | Reinhart ....................... 210/443 |
| 2003/0062301 A1 * | 4/2003 | Merrie et al. ................. 210/454 |

(Continued)

FOREIGN PATENT DOCUMENTS

| DE | 19707132 A1 | 8/1998 |
| WO | 2005005014 A1 | 1/2005 |

*Primary Examiner* — Amber R Orlando
*Assistant Examiner* — Britanny Precht
(74) *Attorney, Agent, or Firm* — Browdy and Neimark, PLLC (57) ABSTRACT

A filter cartridge (30) comprising a filter membrane (33) and at least a support element (31) fixed to the filter membrane (33), the support element being provided with at least a snap-engaging element (36) suitable for snap-engaging to a support body (20) following a reciprocal translation between the filter cartridge (30) and the support body (20) along a nearing axis (A), the support element (31) further comprising disengaging means (38) suitable for disengaging the snap-engaging element (36) from the support body (20) following a reciprocal rotation between the filter cartridge (30) and the support body about the axis (A).

7 Claims, 5 Drawing Sheets

(56) References Cited

U.S. PATENT DOCUMENTS

| | | | |
|---|---|---|---|
| 2004/0154975 A1* | 8/2004 | Girondi | 210/446 |
| 2005/0000886 A1* | 1/2005 | Reynolds et al. | 210/450 |
| 2007/0158263 A1* | 7/2007 | Brandt et al. | 210/437 |
| 2007/0199876 A1* | 8/2007 | Tubby et al. | 210/232 |
| 2007/0235378 A1* | 10/2007 | Mandt et al. | 210/190 |
| 2008/0225637 A1* | 9/2008 | Hogan | B01F 7/00116 366/317 |
| 2011/0023425 A1* | 2/2011 | De Paepe et al. | 55/312 |

\* cited by examiner

FILTER GROUP

TECHNICAL FIELD

The present invention relates to a filter cartridge and a relative filter group. The invention mainly relates to a filter group for comburent air which is conveyed internally of internal combustion engines; however the filter might be used for filtration of other fluids, such as for example exhaust gases, oils or fuel.

In greater detail, the invention relates to air filter groups, especially in applications in which a high flow of air to be filtered is required, such as for example—in motoring applications—lorries, buses, commercial vehicles and work machines, or in industrial applications.

BACKGROUND ART

As is known, the filtering of air in the motoring or industrial field is generally obtained by means of a filter group which comprises an external casing provided with an inlet for fluid to be filtered and an outlet of filtered fluid, and a filtering cartridge suitable for defining a chamber, for example external, communicating with the inlet of the fluid to be filtered.

In this way, the fluid that flows from the inlet towards the outlet of the filter is forced to cross the filter membrane which retains the impurities possibly present therein.

A typical filter cartridge comprises a tubular filter membrane and two support plates, upper and lower, which are fixed to the opposite ends of the filter membrane.

At least one of the support plates is commonly provided with a central opening, aligned with the longitudinal axis of the filter membrane, through which the internal volume of the filter membrane is placed in communication with the inlet of the fluid to be filtered, in a case in which the filter membrane is configured such as to be crossed from inside towards outside, or with the outlet of the fluid, to be filtered, in a case in which the filter membrane is configured such as to be crossed from outside towards inside.

The casing, in these types of air filters, generally comprises a support body, conformed as a flange (or plate), provided with a hole defining the outlet and set in communication with the internal chamber of the filter membrane.

As is known, due to the high flow rate of air to be subjected to filtering for this type of filter group, the filter cartridge must necessarily exhibit considerable dimensions, at least such as to enable passage of the air without exceeding certain values as set by the norms and standards in the sector, which for example impose low load loss values.

Because of the significant dimensions of the filter cartridge, the installation and replacement thereof in these applications can represent a problem connected to the step of moving and manoeuvring it.

In an attempt to alleviate the work of the personnel specialised in installing the filter cartridge, the prior art provides various solutions for removably engaging the filter cartridge to the casing (for example to a cover of a beaker body or a support plate).

A first type of these solutions comprises the use of a bayonet-type engagement: these types of engagements comprise at least two profiled protrusions defined in the filter cartridge, each of which is destined to be inserted in a special groove realised in the support flange, such that the engagement is enacted by a short axial translation of the filter cartridge towards the support flange and a consequently small rotation about the axis of the filter cartridge.

These bayonet couplings, however, exhibit some drawbacks due mainly to the required complexity of the engagement.

It is usually necessary to provide means for blocking the reciprocal rotation between the filter cartridge and the support flange (or casing), which are for example flexible devices, grooves with labyrinthine profiles or threaded organs.

These blocking systems are on the one hand not particularly reliable and not very resistant over time, especially after repeated replacements of the filter cartridge, and on the other hand they lead to an increase in production costs of the filter cartridge and the casing (support flange) as well as costs over time for maintenance operations for replacing the filter cartridge.

A second known type of engagement, alternative to the above-described bayonet couplings, comprises axial snap-engagements, which are however not used in air filter groups, where there are high flow rates of air to be filtered, as the weight and large dimensions of the filter cartridges would made the exact positioning of the engaging means difficult to assess.

Further, the need to ensure engaging of a filter cartridge of considerable weight would necessarily lead to realising an axial snap-fit that would be hard to remove.

DISCLOSURE OF INVENTION

An aim of the present invention is to obviate the above-mentioned drawbacks of the prior art, with a solution that is simple, rational and relatively inexpensive.

These aims are attained by the characteristics of the invention reported in the independent claim. The dependent claims delineate preferred and/or particularly advantageous aspects of the invention.

In particular, the invention provides a filter cartridge comprising a filter membrane and at least a support element fixed to the filter membrane of at least a snap-engaging element destined to snap-fit to a support body following a reciprocal translation between the filter cartridge and the support body along a nearing axis.

In the invention, the support element comprises disengaging means destined to disengage the snap-fitting element from the support body following a reciprocal rotation between the filter cartridge and the support body with respect to the axis.

Thanks to this solution, the disengaging operations of the filter cartridge are facilitated, and it is possible to use hooking elements which are sufficiently rigid and resistant and suited to supporting filter cartridges of considerable weight.

Further, thanks to this solution the filter group is reliable in use, is relatively inexpensive and simple to realise with respect to bayonet-coupling systems commonly used in the sector.

The filter membrane advantageously exhibits an elongate shape with a prevalent development along the axis which is a longitudinal axis of the filter cartridge; further, for example, the filter membrane exhibits a transversal section that is substantially constant along the longitudinal axis.

In the example, the engaging means comprise an elastically yielding tooth destined to give rise to a complementary fit with the support body by means of a snap-coupling in a transversal direction with respect to the axis of the filter cartridge, for example following a limited axial movement of the filter cartridge with respect to the support plate, such as to removably constrain the support body and the filter cartridge to one another.

Thanks to this solution, the installation of the filter cartridge is decidedly simple and rapid.

A further aspect of the invention is that the tooth comprises a flank which is inclined with respect to a radial plane, the inclined flank defining the disengaging means destined to cooperate with the support body for disengaging the tooth from the support body, for example following a limited rotation with respect to the axis of the filter cartridge.

This means that the operations of removing the filter cartridge from the support body for its replacement are particularly advantageous and rapid. The invention further provides a filter group which comprises a support body provided with at least a passage hole for a fluid and at least a respective engaging element which snap-fits to the filter cartridge, which is associated to the support body, such as to delimit a closed volume communicating with the passage hole.

The respective engaging element of the support body advantageously comprises an engaging seating provided with an abutting surface and the engaging element of the filter cartridge is destined to removably engage to the abutting surface.

In particular, the support body of the filter group comprises at least a guide surface, associated to the engaging surface, destined to guide the engaging element of the filter cartridge towards the abutting surface.

Thanks to this solution, the filter cartridge is always guided towards the engaging seating and therefore the alignment of the engaging elements with the seating itself is facilitated; in this way the engagement can be achieved by means of a contained translation of the filter cartridge towards the body destined to support it.

An aspect of the invention is, further, that the support body of the filter group comprises two of the guide surfaces that converge towards the engaging seating, which guide surfaces respectively define an inclined plane, with respect to the abutting surface, for the entry of the engaging element into the engaging seating.

In this way, the filter cartridge is guided towards the respective engaging seating, simply by sliding the engaging elements on one of the guide seatings, independently of its position with respect to the support plate.

The engaging means advantageously comprise a disengaging ramp which is associated to the engaging seating realised in the support body, for disengaging the engaging element of the filter cartridge from the abutting surface of the engaging seating.

In this way, the disengaging operations of the filter cartridge from the body destined to support the filter cartridge are even easier, more rapid and more reliable.

The disengaging ramp defines a plane inclined in a transversal direction with respect to the axis of the filter cartridge, which is destined to flex the tooth in that direction, distancingly from the engaging seating, following a limited rotation of the filter cartridge with respect to the axis thereof.

Still more advantageously, the inclined flank of the tooth of the filter cartridge and the disengaging ramp of the engaging seating are such as to go into dragging contact following an axial rotation of the filter cartridge with respect to the support body, for disengaging the tooth from the abutting surface.

Further, the support body comprises a flange, destined to be solidly and sealedly associated to the filter cartridge, and an appendage deriving from the flange; the engaging seating being realised at the appendage.

Further, with the aim of ensuring hermetic sealing between the support plate and the filter cartridge, the filter group comprises at least a seal ring, for example associated to the filter cartridge, interposed between the filter cartridge and the support body and destined to be compressed between them following the snap-engagement between the engaging element of the filter cartridge and the engaging seating realised in the support body.

BRIEF DESCRIPTION OF DRAWINGS

Further characteristics and advantages of the invention will emerge from a reading of the following description, provided by way of non-limiting example, with the aid of the figures of the accompanying drawings.

BEST MODE FOR CARRYING OUT THE INVENTION

Figure 1:
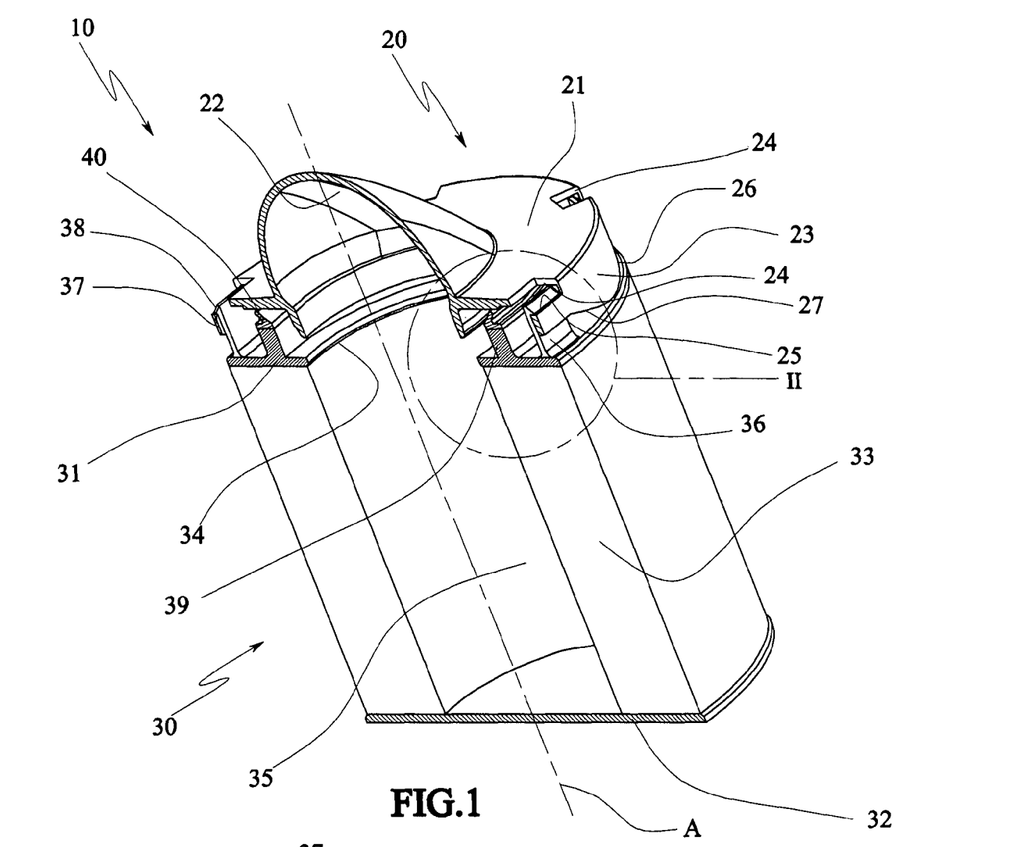
FIG. 1 is an axonometric view in longitudinal section of a filter group of the present invention.
Figure 2:
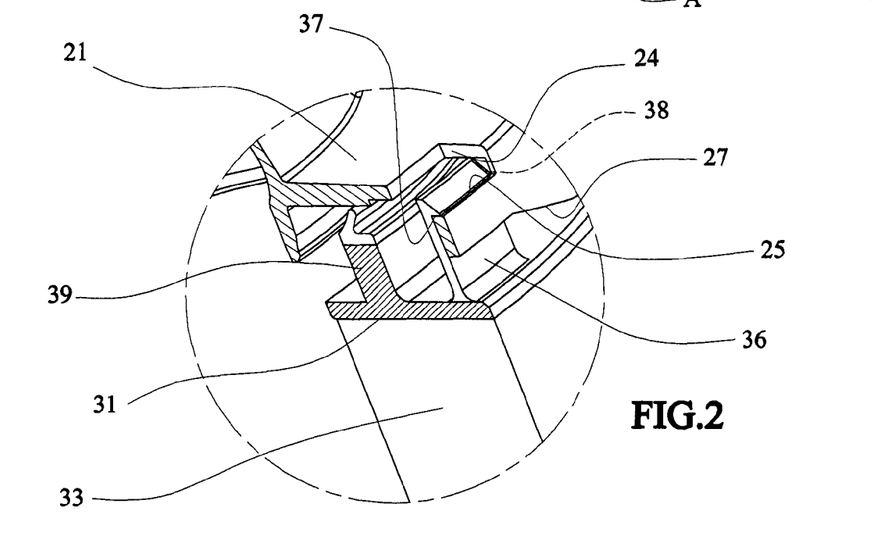
FIG. 2 is detail II of FIG. 1.
Figure 3:
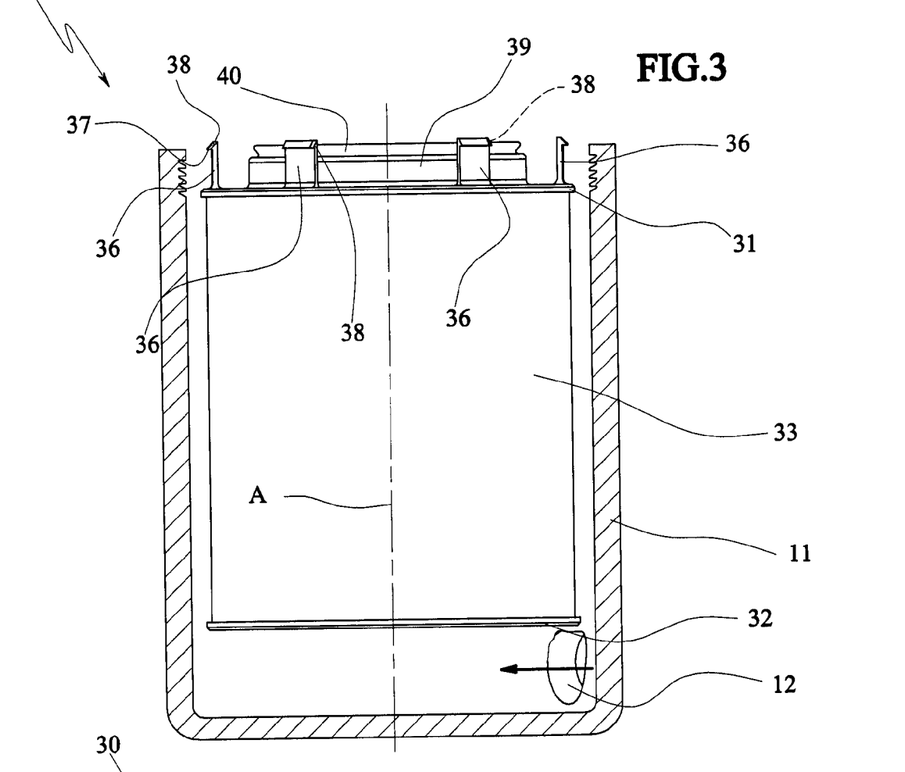
FIG. 3 is a lateral view of a filter cartridge of the filter group of FIG. 1.
Figure 4:
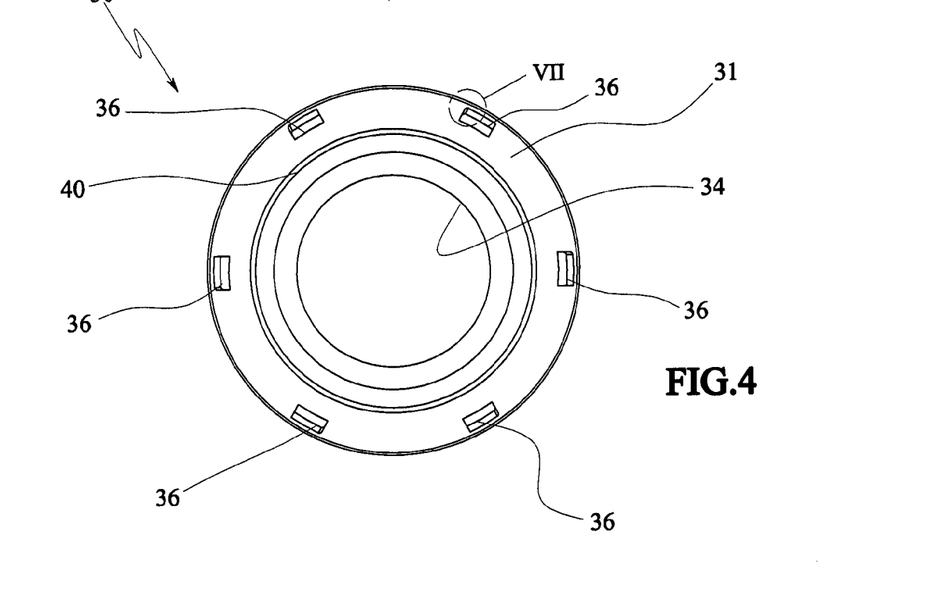
FIG. 4 is a view from above of FIG. 3.
Figures 5, 6:
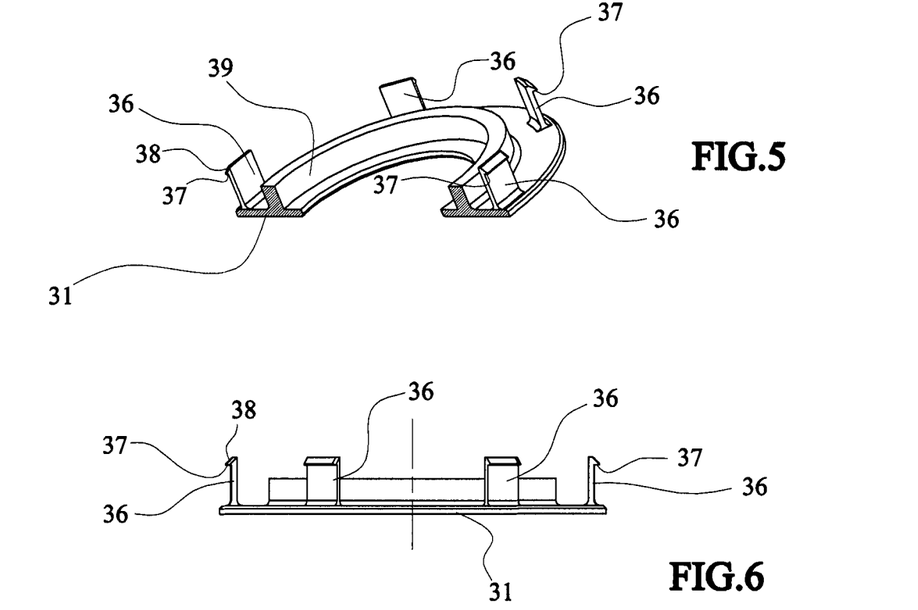
FIG. 5 is an axonometric section view of the upper support plate of the filter cartridge of FIG. 3.
FIG. 6 is a lateral view of FIG. 5.
Figure 7:
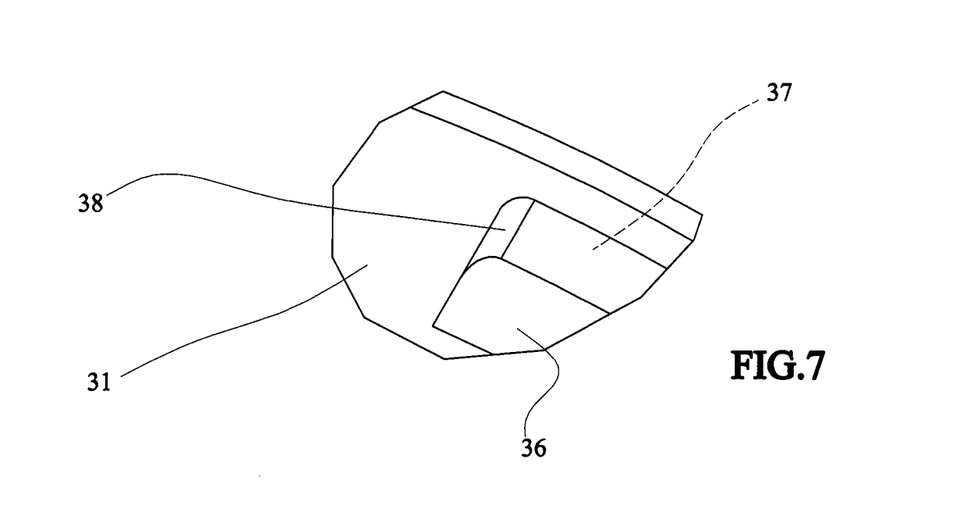
FIG. 7 is enlarged detail VII of FIG. 4.
Figure 8:
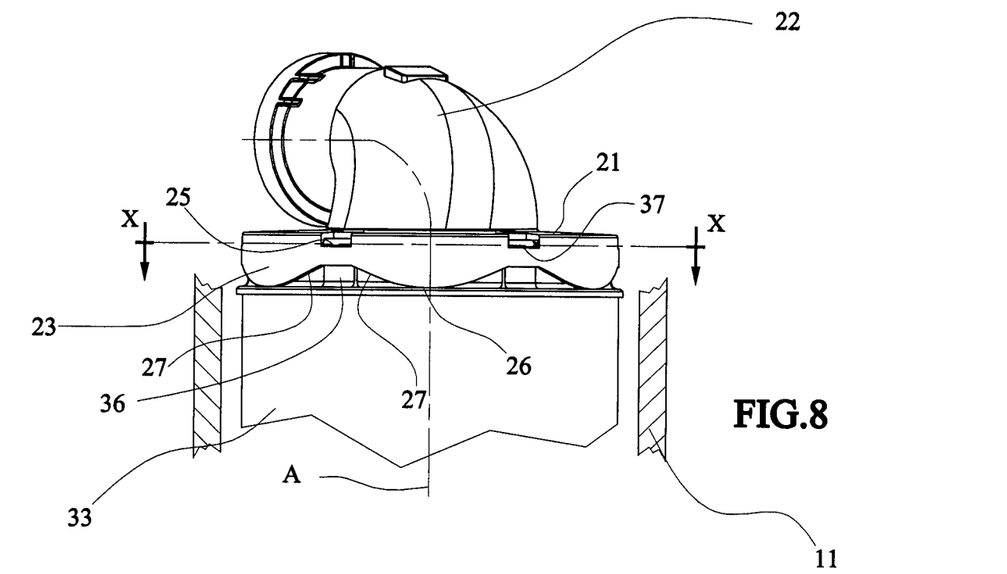
FIG. 8 is a detail of a lateral view of the filter group of FIG. 1.
Figure 9:
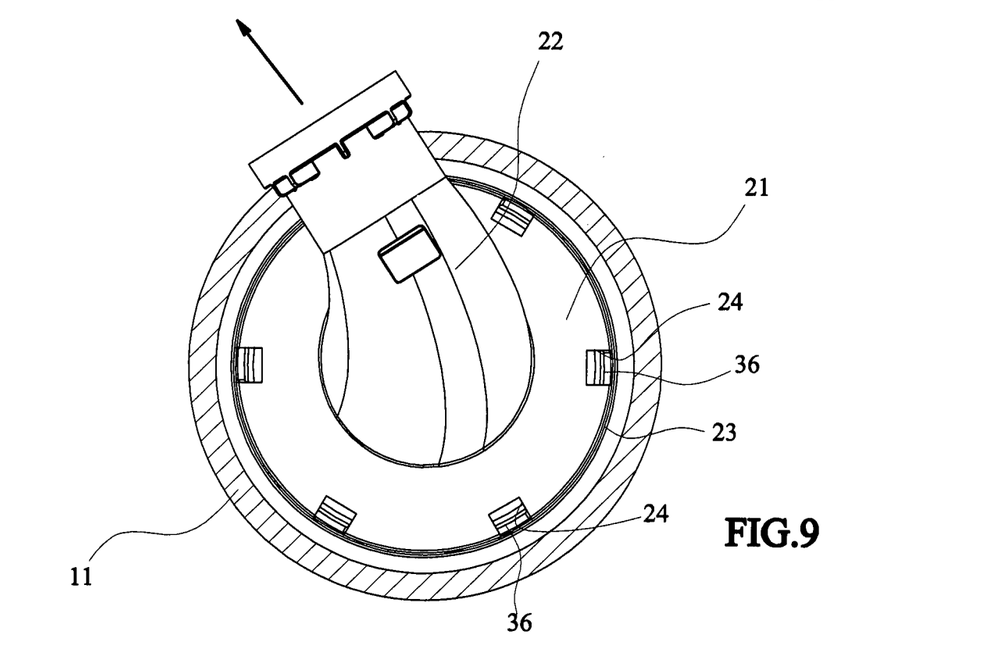
FIG. 9 is a view from above of FIG. 8.

The filter group 10 illustrated in FIG. 1 is an air filter destined to be applied in the motor vehicle sector, in particular for motors of heavy duty vehicles such as lorries, buses, commercial vehicles or self-propelling work vehicles. The filter group 10 comprises an external casing, comprising a beaker-shaped body 11 (visible in FIG. 3) and a plate-shaped support body, denoted in its entirety by 20 in the figures, which is suitable for sealedly closing the beaker body 11 (for example by means of threaded organs or the like, directly or indirectly by means of a cover) and for supporting a filter cartridge 30 suitable for being arranged internally of the beaker body.

The beaker body 11 further defines an inlet hole 12 for the air to be filtered.

The support plate 20 is defined by an annular flange 21 provided with an outlet conduit 22, defining the outlet passage hole of the filtered air, which for example is located superiorly to the annular flange.

On the opposite side with respect to the outlet conduit 22, the support plate 20 comprises a hollow appendage 23 projecting inferiorly of the annular flange 21 and such as to perimetrally delimit the annular flange.

A plurality of engaging seatings 24 are afforded in the appendage 23, for example lateral slots, which are such as to define respective abutting surfaces 25 that are substantially flat and parallel to the annular flange 21.

Each abutting surface 25 is defined by the lower edge of the lateral slot realised in the appendage 23.

The appendage 23, and in particular the lower edge 26 thereof, exhibits two guide surfaces 27 at each engaging seating 24, which guide surfaces 27 are arranged on opposite sides with respect to the respective engaging seating 24 and are inclined such as to converge towards the engaging seating (each pair of guide surfaces is therefore associated to the respective engaging seating, as it is realised on the appendage 23).

Each guide surface 27 exhibits an inclined plane with respect to the plane defined by the abutting surface 25 such as to realise an entry zone towards the respective engaging seating.

In other words, the lower edge 26 of the appendage 23 exhibits a substantially undulated conformation, defined by the guide surfaces 27, which exhibit an inclination of an acute angle with respect to the perpendicular direction to the longitudinal axis A, the inclinations of each pair of guide surfaces 27 being opposite in direction, such as to converge towards the centre thereof.

Between the two guide surfaces 27, the lower edge 26 exhibits a substantially flat profile which is parallel to the abutting surface 25; substantially a bearing limb of the appendage 23 distances the flat profile of the lower edge 26 and the abutting surface 25.

Figure 11:
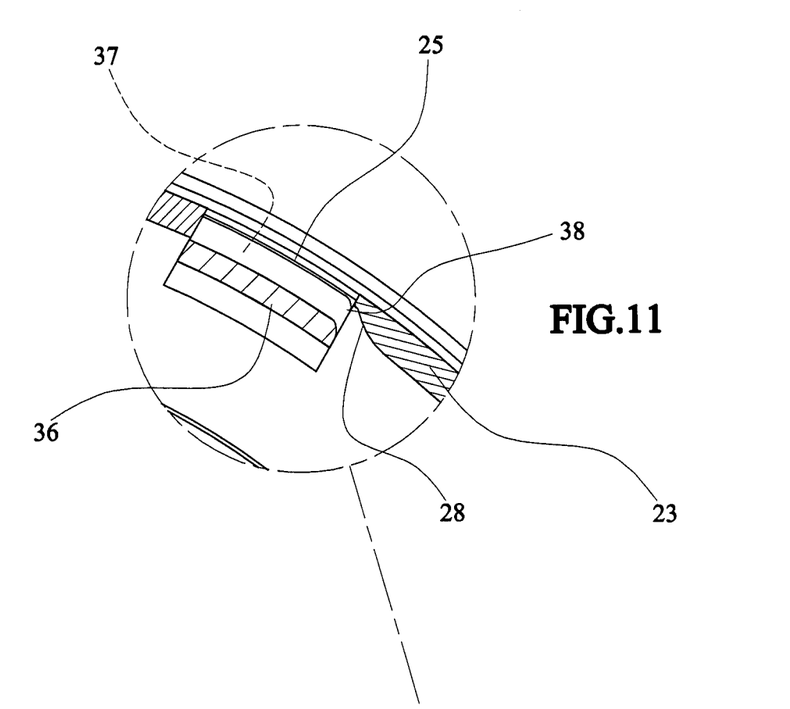
FIG. 11 is an enlarged detail of FIG. 10.

The appendage 23, in proximity of each engaging seating 24, exhibits a disengaging ramp 28 (visible in the detail of FIG. 11), which is defined in the internal lateral wall of the appendage 23; the disengaging ramp 28 is realized by an inclined connecting surface between the external surface and the internal surface of the appendage 23, which defines a salient profile with a relatively low slope between the external surface and the internal surface of the appendage.

The plan profile of the appendage 23 exhibits, at the disengaging ramp 28, a progressively growing thickness (in a radial direction) starting from the lateral slot defining the engaging seating 24.

In the example illustrated in the figures, the appendage 23 exhibits six engaging seatings 24 that are equidistant and aligned in plan view on an imaginary circumference that is coaxial to the annular flange 21.

The annular flange 21 is substantially sealedly associated to the filter cartridge 30: the lower surface of the annular flange 21, destined to face the filter cartridge 30, defines a rest zone for a seal ring 40, which is destined in use to be compressed between the annular flange 21 and the filter cartridge 30, such as to guarantee hermetic closure between the inlet conduit 22 and the filter cartridge.

The filter cartridge 30 comprises an upper support element, in the example an upper support plate 31, and a lower support plate 32, which are fixed to opposite ends of a tubular filter membrane 33, which defines and delimits a substantially-cylindrical internal volume of the filter cartridge 30.

The upper support plate 31 exhibits a central hole 34 which is centred on the longitudinal axis A of the filter membrane 33, which is in communication, by means of the central hole of the annular flange 21, with the outlet conduit 22 of the filtered air.

Thanks to the above-described configuration, the filter cartridge 30 defines a chamber 35, coinciding with the internal volume of the filter membrane 33, which communicates with the outlet conduit 22 of the air to be filtered.

A plurality of engaging teeth 36 (also referred to as engaging elements herein) are fashioned on the surface of the upper support plate 31, opposite the filter membrane 33, which engaging teeth 36 rise from the upper support plate and define an engaging surface 37 facing towards the upper support plate 31. The engaging surface 37 is substantially planar and lies on a plane that is substantially perpendicular to the longitudinal axis A of the filter membrane 33.

Each engaging tooth 36 further comprises an inclined flank 38 (i.e. which exhibits at least an inclined lateral portion with respect to the radial direction), substantially having a complementary shape to the disengaging ramp 28 realised in the appendage 23.

Figure 10:
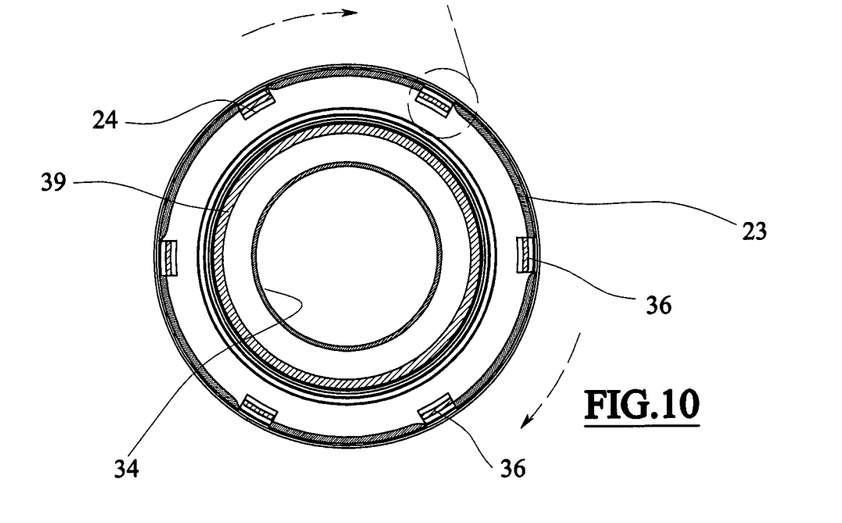
FIG. 10 is section X-X of FIG. 8.

The inclined portion of the inclined flank 38 defines a bevelling on a lateral flank of the engaging tooth 36, such as to facilitate the sliding of the engaging tooth 36 on the disengaging ramp 28, or in any case on the lateral wall of the engaging seating 24, of the appendage 23, following a short rotation (in a disengaging direction indicated by the broken-line arrows in FIG. 10) with respect to the longitudinal axis A of the filter cartridge 30, in relation to the support plate 20.

The flank opposite the inclined flank 38 of the engaging tooth 36 is substantially straight (taking "straight" to mean that it exhibits a flat profile lying on a radial plane), and the engaging seating 24 exhibits a respective straight flank, such as to stably arrest the reciprocal rotation between the filter cartridge 30 and the support plate 20 with respect to the longitudinal axis A in the opposite direction to the disengaging direction.

In particular, in the example reported in the figures there are six engaging teeth 36 which are aligned in plan view with respect to an imaginary circumference that is concentric to the hole defined in the upper support plate 51, and are reciprocally equidistant.

An annular relief 39 afforded in the upper support plate 31 and emerging therefrom is provided in a zone internal of the engaging teeth 36, which annular relief 39 supports the seal ring 40 which in use is compressed between the annular projection 39 and the annular flange 21.

With reference to the above description, the filter group 10 functions as follows.

To assemble the filter group 10, it is sufficient to engage the engaging teeth 36 of the filter cartridge 30 in the respective engaging seatings 24 of the support plate 20, by nearing the filter cartridge 30 in an axial direction; in any angular position the filter cartridge 30 happens to be in, the engaging teeth 36 initially contact the lower edge 26 of the appendage 23.

Should the engaging teeth 36 not be already aligned with the engaging seating 24, the teeth 36 contact a portion of the lower edge 26 having one of the guide surfaces 27; when the filter cartridge 30 is pressed axially towards the support plate 20 (and/or rotating slightly with respect to the longitudinal axis A) the engaging teeth 36 slide on the guide surfaces 27 until they align with the respective engaging seatings 24.

In this position, with a simple further axial translation of the filter cartridge 30, such as to enable the engaging tooth 36—with a radial flexing—to pass over the bearing lip of the appendage 23 which separates the lower edge 26 thereof from the engaging seating 24, the engaging teeth 36 snap-engage with the respective lateral slots realised in the appendage 23 and thus also the engaging seatings 24.

In particular, the engaging surface 27 of each engaging seating 26 stably rests on each abutting surface 25 of the respective engaging seating 24.

To remove the filter cartridge 30 from the engagement with the support plate 20 it is sufficient to slightly rotate the filter cartridge in the direction (denoted in FIG. 10) in which the inclined flank 38 of the engaging tooth 36 is brought into contact with the disengaging ramp 28 of the engaging seating 24.

By continuing the rotation of the filter cartridge 30 in the same direction, the reciprocal dragging between the inclined flanks 38 and the disengaging ramps 28 flexes the engaging teeth 36 radially, such that each engaging surface 37 distances from the respective engaging surface 25; in this way the engaging teeth are free to slide in an axial direction distancingly from the support plate 20, freeing the filter cartridge 30 which can therefore be replaced.

In the embodiment shown in the figures and described herein above, the engaging elements 36 are associated the filter cartridge 30 (in particular to the upper support plate 31 thereof) and the engaging seating 24 is realised in the support late 20, though alternatively the engaging seating could be afforded in the filter cartridge (for example in the upper support plate thereof) and the engaging element, i.e. the engaging teeth, in the support plate or in the cover of the casing or other body destined to support the filter cartridge.

Further, a technical expert in the sector might make other numerous modifications of a technical-applicational nature to the filter group 10 as described above, without its forsaking the ambit of the invention as claimed herein below.

The invention claimed is:

1. A filter group comprising:
    a filter cartridge a tubular filter membrane and at least a support plate fixed to the filter membrane, the filter cartridge having a longitudinal axis, the support plate having at least an elastically yielding tooth configured to yield in a radial direction responsive to an axial compression thereon in a direction parallel to the longitudinal axis, the elastically yielding tooth defining an engaging surface facing towards the support plate, and comprising a flank inclined with respect to a radial plane of the filter cartridge and configured to flex the elastically yielding tooth in a radial direction responsive to a dragging rotation of the filter cartridge around the longitudinal axis,
    a support body having at least a passage hole defined therein for a fluid and at least a respective engaging seating,
    the support body comprising:
        a flange to solidly and sealingly engage with the filter cartridge,
        an appendage extending longitudinally from the flange, wherein an opening is defined in an edge between the flange and the appendage, the opening forming an engaging seating having an abutting surface snap-engage with the elastically yielding tooth of the filter cartridge and associated with the support body such as to delimit a closed volume communicating with the passage hole,
        a disengaging ramp associated with the engaging seating suitable for disengaging the elastically yielding tooth from the abutting surface following a reciprocal rotation between the filter cartridge and the support body about the axis, whereby the inclined flank of the tooth is brought in contact with the disengaging ramp.

2. The filter group of claim 1, wherein the filter membrane exhibits an elongate shape with a prevalent development along the longitudinal axis.

3. The filter group of claim 1, wherein the support body comprises at least a guide surface associated to the engaging seating and guiding the engaging surface of the elastically yielding tooth towards the abutting surface.

4. The filter group of claim 3, further comprising two of the guide surfaces which converge towards the engaging seating and which respectively define a plane which is inclined with respect to the abutting surface, for entry of the elastically yielding tooth in the engaging seating.

5. The filter group of claim 1, wherein the disengaging ramp is defined as an internal wall of the appendage exhibiting a progressively growing thickness in a radial direction starting from the engaging seating for disengaging the elastically yielding tooth from the abutting surface.

6. The filter group of claim 5, wherein the disengaging ramp defines a plane that is inclined in a transverse direction to the longitudinal axis, the disengaging ramp in engaging the tooth, flexes the tooth in the transverse direction, spaced from the engaging seating, following a rotation of the filter cartridge with respect to the axis thereof.

7. The filter group of claim 1, further comprising at least a seal ring interposed between the filter cartridge and the support body and destined to be compressed there-between following a snap-engaging between the engaging element and the engaging sealing.

* * * * *